US009244443B2

(12) United States Patent
Kobayashi

(10) Patent No.: US 9,244,443 B2
(45) Date of Patent: Jan. 26, 2016

(54) RECOVERY METHOD FOR LOGISTICS SYSTEM

(76) Inventor: Yoshimasa Kobayashi, Inuyama (JP)

( * ) Notice: Subject to any disclaimer, the term of this patent is extended or adjusted under 35 U.S.C. 154(b) by 366 days.

(21) Appl. No.: 13/878,740

(22) PCT Filed: Sep. 5, 2011

(86) PCT No.: PCT/JP2011/070102
§ 371 (c)(1),
(2), (4) Date: Apr. 10, 2013

(87) PCT Pub. No.: WO2012/049917
PCT Pub. Date: Apr. 19, 2012

(65) Prior Publication Data
US 2013/0197673 A1      Aug. 1, 2013

(30) Foreign Application Priority Data
Oct. 15, 2010    (JP) .................................. 2010-232148

(51) Int. Cl.
*G05B 13/00* (2006.01)
*G06Q 10/06* (2012.01)
*G06Q 10/08* (2012.01)

(52) U.S. Cl.
CPC ................ *G05B 13/00* (2013.01); *G06Q 10/06* (2013.01); *G06Q 10/08* (2013.01)

(58) Field of Classification Search
CPC ......... G06Q 10/06; G06Q 10/08; G05B 13/00
See application file for complete search history.

(56) References Cited

U.S. PATENT DOCUMENTS 5,870,715 A * 2/1999 Belitz et al. ...................... 705/22
6,089,453 A * 7/2000 Kayser et al. .................. 235/383
(Continued)

FOREIGN PATENT DOCUMENTS

JP    06-096380 A    4/1994
JP    07-215425 A    8/1995
(Continued)

OTHER PUBLICATIONS

Translation of International Preliminary Report on Patentability issued May 16, 2013, for corresponding International PCT Application No. PCT/JP2011/070102.
International Search Report of PCT/JP2011/070102 as published Dec. 6, 2011.

*Primary Examiner* — Ramesh Patel
(74) *Attorney, Agent, or Firm* — Adli Law Group P.C.

(57) ABSTRACT

The object is to maintain the operations of a logistic system. The recovering method of the logistic system includes a plurality of controllers connected with each other via a local network. A recovery method for the logistic system comprises detecting an abnormal state of the plurality of controllers, outputting a switching requesting signal, receiving a control signal, and outputting the control signal. In outputting the switching requesting signal, when an abnormal controller that shows the abnormal state is detected, a switching requesting signal to switch from the abnormal controller to an alternate controller is outputted from the logistic system to the alternate controller. In receiving the control signal, a control signal that controls at least a part of operations of the logistic system instead of the abnormal controller is received from the alternate controller.

9 Claims, 5 Drawing Sheets

(56) References Cited

U.S. PATENT DOCUMENTS

| | | | |
|---|---|---|---|
| 6,108,662 A * | 8/2000 | Hoskins et al. | 700/95 |
| 6,226,558 B1 * | 5/2001 | Schneider et al. | 700/47 |
| 6,237,020 B1 * | 5/2001 | Leymann et al. | 709/201 |
| 2002/0002632 A1 * | 1/2002 | Nilsson | 709/315 |
| 2004/0073404 A1 * | 4/2004 | Brooks et al. | 702/183 |
| 2004/0128180 A1 * | 7/2004 | Abel et al. | 705/9 |
| 2008/0173710 A1 * | 7/2008 | Skaaksrud et al. | 235/384 |
| 2008/0208397 A1 * | 8/2008 | Miklos | 701/3 |
| 2009/0095600 A1 * | 4/2009 | Reichenbach et al. | 198/810.01 |
| 2009/0114714 A1 * | 5/2009 | Huang et al. | 235/376 |
| 2010/0179862 A1 * | 7/2010 | Chassin et al. | 705/10 |

FOREIGN PATENT DOCUMENTS

| | | |
|---|---|---|
| JP | 08-237762 A | 9/1996 |
| JP | 09-305206 A | 11/1997 |
| JP | 2002-316705 A | 10/2002 |
| JP | 2003-264216 A | 9/2003 |
| JP | 2009-009246 A | 1/2009 |
| JP | 2002-36705 A | 12/2011 |

* cited by examiner

RECOVERY METHOD FOR LOGISTICS SYSTEM

CROSS-REFERENCE

The present application is the U.S. national phase application of PCT/JP2011/070102, filed on Sep. 5, 2011, published as WO2012/049917, which claims priority to JP2010-232148 filed on Oct. 15, 2012. Each of these applications is incorporated herein by reference in their entirety.

FIELD OF THE INVENTION

The invention relates to a logistic system that includes a plurality of controllers connected by a network.

BACKGROUND SECTION OF THE INVENTION

Conventionally, a logistic system that conveys and stores articles under the control of a plurality of controllers connected with each other via a network (Japanese Laid-Open Patent Application 2003-264216, for example) is known.

The logistic system comprises, for example, a supervisory controller that is a high-level controller and a plurality of conveying controllers that are provided under the supervisory controller. A working area of a factory that has the logistic system is sectioned into a plurality of areas. In each area, a conveying device such as an automatic guided conveying vehicle or a conveyer and a device such as a communication apparatus are arranged. The conveying controller is arranged in each area. The conveying controller controls the transportation of articles under the management of the supervisory controller.

Conventionally, in such a logistic system, when the conveying controller is broken, the whole of the logistic system is stopped until the conveying controller is fixed. Then, a service man is sent to fix the conveying controller and replace the broken conveying controller with the working conveying controller. It should be noted that the broken conveying controller is monitored remotely via a telephone line.

It takes long time to fix the conveying controller by the above means. In addition, stopping the whole of the logistic system until the conveying controller is fixed causes the problem of lowering the productivity of the logistic system.

SUMMARY SECTION OF THE INVENTION

The object of the invention is to maintain the operation of a logistic system.

A plurality of aspects will be explained below as means of solving the problems. These aspects can be combined arbitrarily according to the requirements.

A recovery method for a logistic system according to one aspect of the present invention is a recovery method for a logistic system in a system that includes a logistic system having a local network and an alternate controller connected to the logistic system.

The logistic system includes a plurality of controllers connected with each other via the local network. The alternate controller is connected to the logistic system via a wide area network and configured to perform a same functionality as the controller.

The recovery method for the logistic system comprises detecting an abnormal state of the plurality of controllers, outputting a switching requesting signal, receiving a control signal, and outputting the control signal. In detecting the abnormal state of the plurality of controllers, an abnormal state of the plurality of controllers is detected in the logistic system. In outputting the switching requesting signal, when an abnormal controller that shows the abnormal state is detected, a switching requesting signal to switch from the abnormal controller to the alternate controller is outputted from the logistic system to the alternate controller. In receiving the control signal, a control signal that controls at least a part of operations of the logistic system instead of the abnormal controller is received from the alternate controller. In outputting the control signal, the control signal received from the alternate controller is outputted.

In this case, when the abnormal state occurs in the controller, the alternate controller controls at least a part of operations of the logistic system instead of the abnormal controller. Therefore, since the operations of the whole of the logistic system can be maintained, the lowering of the productiity due to the stopping of the whole of the logistic system can be avoided.

In the recovery method, outputting the switching requesting signal may include notifying a user of a switching requesting message that provides a notification of switching from the abnormal controller to the alternate controller.

In this case, notifying the user of the switching requesting message prompts the user to switch from the abnormal controllers to the alternate controller, and therefore the user can perform the switching quickly.

The recovery method may further comprise controlling communications between the logistic system and the alternate controller via the wide area network.

There is the case where the delay of data communications via the wide area network occurs due to the time lag of the data communications. In this case, however, by controlling the communications via the wide area network, the communications can be performed without considering the delay as a communication error as soon as the delay occurs.

In the recovery method, the plurality of controllers may include a supervisory controller and conveying controllers that are controlled by the supervisory controller. In this case, in outputting the switching requesting signal, the switching requesting signal is sent from either the supervisory controller or the conveying controllers except for the abnormal controller to the alternate controller. Then, the control signal can be received from the alternate controller and outputted. By this, the logistic system can be controlled reliably by the control signal from the alternate controller even if the abnormal state of the controller occurs.

A logistic system according to other aspect of the present invention is a logistic system that includes a plurality of controllers connected with each other via a local network. The logistic system comprises an abnormality detecting unit, a switching requesting unit, a control signal receiving unit, and a control signal outputting unit. The abnormality detecting unit detects an abnormal state of the plurality of controllers in the logistic system. The switching requesting unit outputs a switching requesting signal to switch from an abnormal controller to an alternate controller from the logistic system to the alternate controller when the abnormal controller that shows the abnormal state is detected. The alternate controller is connected to the logistic system via a wide area network and performs a same functionality as the controller. The control signal receiving unit receives a control signal that controls at least a part of operations of the logistic system instead of the abnormal controller from the alternate controller. The control signal outputting unit outputs the control signal received from the alternate controller.

In the logistic system, the switching requesting unit may notify a user of a switching requesting message that provides a notification of switching from the abnormal controller to the alternate controller when the abnormal controller is detected.

The logistic system may further comprise a communication controlling unit configured to control communications between the logistic system and the alternate controller via the wide area network.

In the logistic system, the plurality of controllers may include a supervisory controller and conveying controllers that are controlled by the supervisory controller. In this case, at least one of the supervisory controller and the conveying controllers may comprise the switching requesting unit, the control signal receiving unit, and the control signal outputting unit.

In the logistic system, one of the supervisory controller and the conveying controllers except for the abnormal controller may control a flow of articles in the logistic system.

According to the present invention, at least a part of the operations of the logistic system can be controlled by the alternate controller instead of the abnormal controller. Therefore, the operation of the logistic system can be maintained. As a result, the lowering of the productivity due to the stopping of the whole of the logistic system can be avoided.

DETAILED DESCRIPTION OF THE INVENTION

1. First Embodiment (1) Overall Structure of a Logistic System

Figure 1:
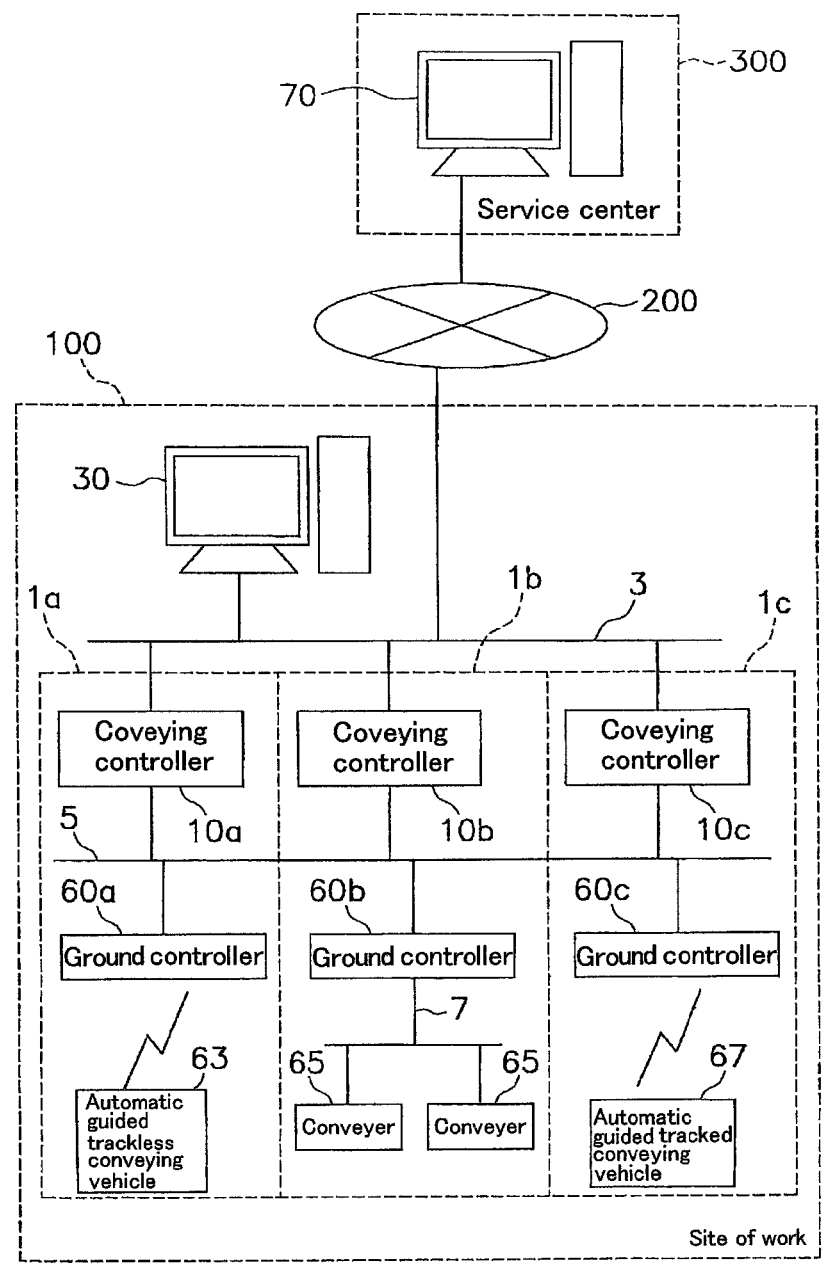
FIG. 1 is a schematic of a logistic system.

In the following, a logistic system 100 as one embodiment according to the present invention will be explained, referring to FIG. 1. FIG. 1 is a schematic of the logistic system 100.

The logistic system 100 is a system that conveys articles by using conveying devices. The logistic system 100 is arranged in, for example, a factory. The logistic system 100 comprises a plurality of conveying controllers 10a, 10b, and 10c, a supervisory controller 30, a plurality of ground controllers 60a, 60b, and 60c, and a plurality of conveying devices.

The plurality of conveying devices include, for example, an automatic guided trackless conveying vehicle 63, conveyers 65, and an automatic guided tracked conveying vehicle 67. The site of work of the factory is sectioned into a plurality of areas. In each area, one of the conveying controllers 10a, 10b, or 10c and one of the ground controllers 60a, 60b, or 60c are arranged. In each area, the ground controllers 60a, 60b, and 60c control the operations of the conveying devices arranged in the same area in accordance with the commands of the conveying controllers 10a, 10b, and 10c. The ground controllers 60a, 60b, and 60c comprise, for example, Programmable Logic Controllers (PLC). The ground controller 60a, 60b, and 60c control the operations of the conveying devices via a Local Area Network (LAN) or a field network 7.

The supervisory controller 30 is arranged in higher level than the conveying controllers 10a, 10b, and 10c. The supervisory controller 30 manages and controls the conveying controllers 10a, 10b, and 10c. The details of the conveying controllers 10a, 10b, and 10c and the supervisory controller 30 will be explained later.

The supervisory controller 30 and the conveying controllers 10a, 10b, and 10c are connected with each other via a LAN 3 such as Ethernet (registered trademark) so as to communicate with each other. In addition, the conveying controllers 10a, 10b, and 10c and the ground controllers 60a, 60b, and 60c are connected with each other via a LAN 5 such as an Ethernet-based FA network so as to communicate with each other.

In this embodiment, the site of work of the factory is sectioned into three areas 1a, 1b, and 1c. In the area 1a, the conveying controller 10a, the ground controller 60a, and the automatic guided trackless conveying vehicle 63 are arranged. In the area 1b, the conveying controller 10b, the ground controller 60b, and the two conveyers 65 are arranged. In the area 1c, the conveying controller 10c, the ground controller 60c, and the automatic guided tracked conveying vehicle 67 are arranged.

Here, for example, when an article is conveyed from the left side to the right side of FIG. 1, the article in the area 1a is conveyed by the automatic guided trackless conveying vehicle 63. Here, the ground controller 60a controls the operations of the automatic guided trackless conveying vehicle 63 in accordance with the commands of the conveying controller 10a via a LAN. Next, the article is transported from the area 1a to the area 1b. Here, the signal representing the delivery and receipt of the article is sent and received between the conveying controller 10a in the area 1a and the conveying controller 10b in the area 1b. Next, the article in the area 1b is conveyed by the conveyers 65. Here, the ground controller 60b controls the operations of the conveyers 65 via the field network 7 in accordance with the commands of the conveying controller 10b. Next, the article is transported from the area 1b to the area 1c. Here, the signal representing the delivery and receipt of the article is sent and received between the conveying controller 10b in the area 1b and the conveying controller 10c in the area 1c. Finally, the article in the area 1c is conveyed by the automatic guided tracked conveying vehicle 67. Here, the ground controller 60c controls the operations of the automatic guided tracked conveying vehicle 67 in accordance with the commands of the conveying controller 10c.

Here, the automatic guided trackless conveying vehicle 63, the conveyers 65, and the automatic guided tracked conveying vehicle 67 are used as one example of the conveying devices. However, the conveying devices may be anything to convey articles. For example, the conveying device may be a stacker crane or an overhead travelling vehicle. In addition, the example where the conveying devices are arranged in each area of the site of work is explained here. However, instead of the conveying devices, a storage and a transfer equipment may be arranged. Moreover, instead of the ground controllers 60a, 60b, and 60c, storing controllers configured to control the acceptance, the delivery, and the storing of the articles may be arranged.

The logistic system 100 is connected to a service center 300 via a wide area network such as the Internet 200 (hereinafter, the Internet). In more detail, the logistic system 100 is connected to an alternate controlling apparatus 70 arranged in the service center 300 via the Internet 200. Here, the alternate controlling apparatus 70 is a computer terminal arranged in the service center 300. The alternate controlling apparatus 70 works as the alternate controller. As described later, when the conveying controller is broken, the alternate controlling apparatus 70 replaces the functionality of the conveying controller instead of the broken conveying controller. It should be noted that the service center 300 is arranged at the place far from the factory where the logistic system 100 is arranged.

(2) Structure of the Conveying Controller

Figure 2:
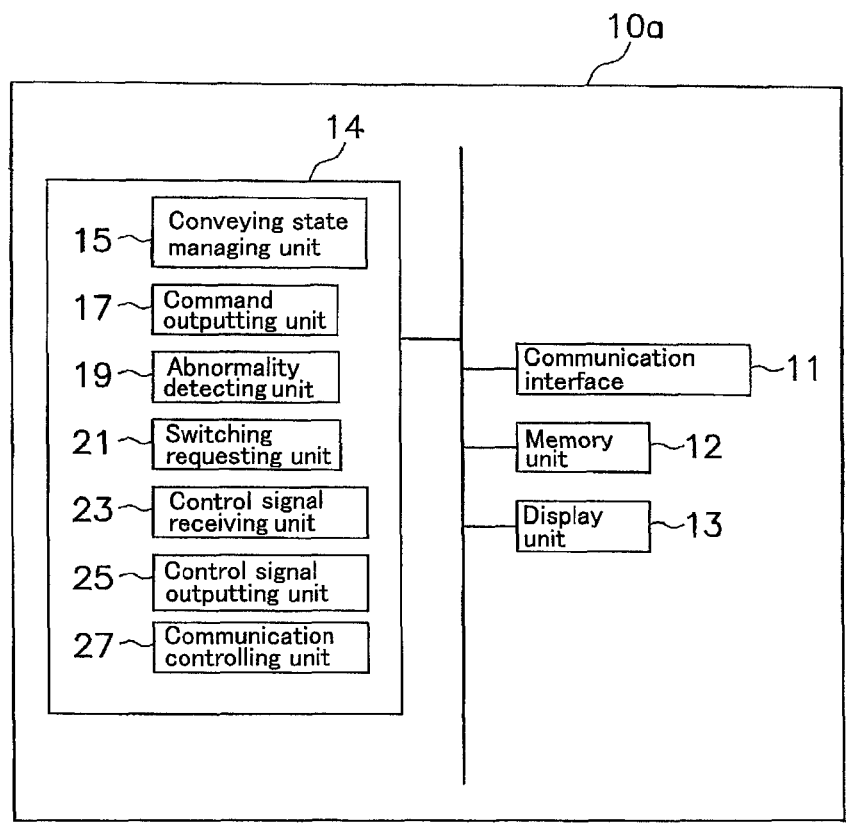
FIG. 2 is a block diagram showing a detailed structure of a conveying controller.

The conveying controllers 10a, 10b, and 10c are controllers that control the flow of articles in the logistic system 100. The structure of the conveying controllers 10a, 10b, and 10c will be explained referring to FIG. 2. Since the conveying controllers 10a, 10b, and 10c have the same structure, in the following, the structure of the conveying controller 10a will be explained as an example. FIG. 2 is a block diagram of the structure of the conveying controller 10a.

The conveying controller 10a includes a communication interface 11, a memory unit 12, a display unit 13, and a control unit 14.

The communication interface 11 receives and sends data via the LAN 3 from/to the other conveying controllers 10b and 10c and the supervisory controller 30. In addition, the communication interface 11 receives and sends data via the LAN 5 from/to the ground controllers 60a, 60b, and 60c. Moreover, the communication interface 11 receives and sends data via the Internet 200 from/to the alternate controlling apparatus 70. It should be noted that receiving and sending data are performed by using TCP/IP and etc., for example.

The memory unit 12 comprises a Random Access Memory (RAM), a Read Only Memory (ROM), and etc. The RAM functions as a working area for executing a program. The ROM stores a controlling program, predetermined parameters, and etc. The memory unit 12 according to this embodiment further stores a controlling program that controls the flow of articles in the logistic system 100.

The display unit 13 is a display device such as a liquid crystal display panel and etc. The display device 13 displays a switching requesting message described later, when an abnormality detecting unit 19 (described later) detects an abnormal state of other conveying controller 10b or 10c in the logistic system 100. In addition, the display unit 13 may display a message alarming an occurrence of the abnormal state of the conveying controllers 10b and 10c.

The control unit 14 comprises a Central Processing Unit (CPU) and etc., for example. The control unit 14 executes the control program stored in the memory unit 12 and controls the operations of the whole of the conveying controller 10a.

The control unit 14 comprises a conveying state managing unit 15, a command outputting unit 17, an abnormality detecting unit 19, a switching requesting unit 21, a control signal receiving unit 23, a control signal outputting unit 25, and a communication controlling unit 27.

The conveying state managing unit 15 manages a conveying state of articles in the logistic system 100. The conveying state managing unit 15 manages the positions of articles in the logistic system 100 by communicating all the time with the conveying state managing units 15 of the conveying controllers 10b and 10c in other areas via the LAN 3. In addition, the conveying state managing unit 15 outputs an article delivering signal to the conveying state managing units 15 of the conveying controllers 10b and 10c in other areas when articles are delivered to other areas. Moreover, the conveying state managing unit 15 outputs an article receiving signal to the conveying state managing unit 15 in other areas when article is transported from the other areas.

The command outputting unit 17 outputs a control signal to the ground controller 60a when articles to be conveyed exist in the area 1a. This control signal controls the operations of the automatic guided trackless conveying vehicle 63. It should be noted that the command outputting unit 17 outputs the control signal to the ground controllers 60b and 60c when articles to be conveyed exist in the areas 1b and 1c. This control signal controls the operations of the conveyers 65 and the automatic guided tracked conveying vehicle 67.

The abnormality detecting unit 19 detects an abnormal state of the other conveying controller 10b or 10c in the logistic system 100. In addition, the abnormality detecting unit 19 may notify a user such as a worker at the site of work of an occurrence of the abnormal state of the conveying controller 10a, 10b, or 10c. The abnormal state represents the state where the conveying controller 10b or 10c is broken. For example, the malfunction of the conveying controller 10b or 10c includes a malfunction due to hardware crash and/or a case where the power supply cannot be switched on. Hereinafter, the conveying controller in the abnormal state is called an abnormal controller.

For example, when the conveying controller 10b is broken, the communication with the conveying controller 10b via the conveying state managing unit 15 is stopped. As a result, the abnormality detecting unit 19 of the conveying controller 10a can detect the abnormal state of the conveying controller 10b. The abnormality detecting unit 19 in this embodiment may, when the abnormal controller is detected, output an abnormality detecting signal that includes identification information such as an IP address and etc. of the abnormal controller to the supervisory controller 30.

The switching requesting unit 21 outputs a switching requesting signal to switch from the abnormal controller to the alternate controlling apparatus 70 when the abnormality detecting unit 19 detects the abnormal state of the other controller 10b or 10c in the logistic system 100. The switching requesting signal includes identification information such as an IP address and etc. of the abnormal controller. The switching requesting unit 21 outputs the switching requesting signal to the alternate controlling apparatus 70 via the Internet 200. The alternate controlling apparatus 70 works as a controller replacing the abnormal controller (an alternate controller).

In addition, the switching requesting unit 21 may notify the user of a switching requesting message via the display unit 13. The switching requesting message is a message that provides a notification of switching from the abnormal controller to the alternate controlling apparatus 70. By displaying such switching requesting message on the display unit 13, the user can be notified about the switching from the abnormal controllers to the alternate controlling apparatus 70, thereby prompting the user to fix the abnormal controller quickly. It should be noted that the switching requesting message may include information recognizing the abnormal controller. In addition, the switching requesting message may include information recognizing the alternate controlling apparatus 70.

The control signal receiving unit 23 receives a connection request from the alternate controlling apparatus 70 via the Internet 200. In addition, the control signal receiving unit 23 receives via the Internet 200 a control signal that is outputted by the alternate controlling apparatus 70 according to the switching requesting signal from the abnormal controller to the alternate controlling apparatus 70. The control signal is a signal that performs the functionality of the conveying controller instead of the abnormal controller. For example, when the conveying controller 10b is the abnormal controller, the control signal includes signals commanding the ground controller 60b to control the operations of the conveyers 65.

The control signal outputting unit 25 outputs the control signal received by the control signal receiving unit 23 instead of the abnormal controller. For example, when the conveying controller 10b is the abnormal controller, the control signal outputting unit 25 outputs the control signal to the ground controller 60b via the LAN 5. Thus, the control signal outputting unit 25 outputs the control signal from the alternate controlling apparatus 70 to the ground controller 60b. This enables the alternate controlling apparatus 70 to perform the functionality of the conveying controller 10b instead of the conveying controller 10b even if the conveying controller 10b is in the abnormal state.

The communication controlling unit 27 controls communications from the alternate controlling apparatus 70. For example, the communication controlling unit 27 controls communications relating to the connection request from the alternate controlling apparatus 70. The communication controlling unit 27 extends a waiting time in receiving the connection request from the alternate controlling apparatus 70. The waiting time corresponds to a predetermined period of time that is required from the timing when the switching requesting unit 21 outputs the switching requesting signal to the alternate controlling apparatus 70 via the Internet 200 to the timing when the control signal receiving unit 23 receives the connection request from the alternate controlling apparatus 70. However, in receiving and sending data via the Internet 200, there is the case where a delay of communications occurs due to a time lag, etc. For this, when the control signal receiving unit 23 does not receive the connection request from the alternate controlling apparatus 70 at the time when the waiting time is beyond a predetermined waiting time that is set in advance in the control unit 14, the communication controlling unit 27 extends the waiting time. Thus, since the communication error does not occur as soon as the waiting time is beyond the predetermined waiting time, the control signal receiving unit 23 can receive the connection request from the alternate controlling apparatus 70.

(3) Structure of the Supervisory Controller

Figure 3:
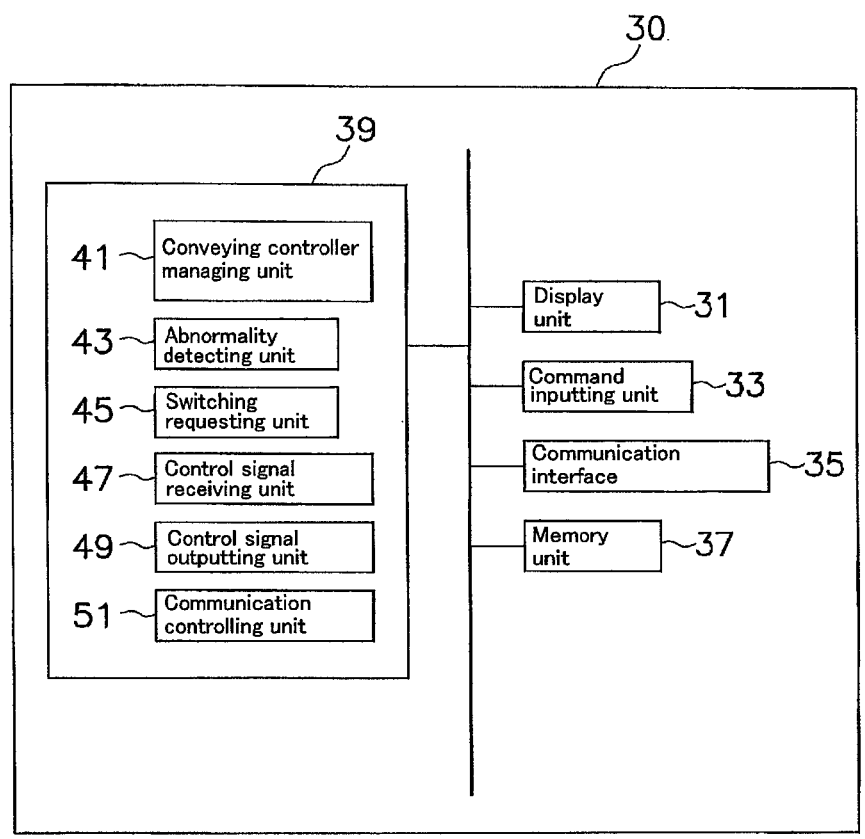
FIG. 3 is a block diagram showing a detailed structure of a supervisory controller.

The supervisory controller 30 is arranged in higher-level than the conveying controllers 10a, 10b, and 10c. The supervisory controller 30 manages and controls the conveying controllers 10a, 10b, and 10c. In the supervisory controller 30, an optimization program that takes a production schedule into consideration is executed and signals with the production schedule made are sent to each conveying controller 10a, 10b, or 10c. Referring to FIG. 3, the structure of the supervisory controller 30 will be explained. FIG. 3 is a block diagram showing the structure of the supervisory controller 30.

The supervisory controller 30 comprises a display unit 31, a command inputting unit 33, a communication interface 35, a memory unit 37, and a control unit 39.

The display unit 31 includes a display device such as a liquid crystal display panel and etc. and a touch sensor. The display unit 31 displays the switch requesting message that provides a notification of switching from the abnormal controller to the alternate controlling apparatus 70 when the abnormality detecting unit 19 of the conveying controller 10a, 10b, or 10c or the abnormality detecting unit 43 (described later) of the supervisory controller 30 detects the abnormal state of the conveying controller 10a, 10b, or 10c in the logistic system 100. In addition, the display unit 31 may display the message alarming the occurrence of the abnormal state of the conveying controller.

The command inputting unit 33 comprises, for example, hard keys to input various commands from the user.

The communication interface 35 sends and receives data to/from the conveying controllers 10a, 10b, and 10c via the LAN 3. In addition, the communication interface 35 sends and receives data to/from the alternate controlling apparatus 70 via the Internet 200. It should be noted that sending and receiving data is performed by using TCP/IP and etc., for example.

The memory unit 37 comprises a Random Access Memory (RAM), a Read Only Memory (ROM), a hard disk apparatus, and etc. The RAM functions as a working area for executing a program. The ROM stores a controlling program and predetermined parameters. The hard disk apparatus stores a controlling program that manages and controls the conveying controllers 10a, 10b, and 10c.

The control unit 39 comprises a Central Processing Unit (CPU), for example. The control unit 39 manages and controls the operations of the whole of the supervisory controller 30 by executing the controlling program stored in the memory unit 37.

The control unit 39 comprises a conveying controller managing unit 41, an abnormality detecting unit 43, a switching requesting unit 45, a control signal receiving unit 47, a control signal outputting unit 49, and a communication controlling unit 51.

The conveying controller managing unit 41 manages and controls the conveying controllers 10a, 10b, and 10c.

The abnormality detecting unit 43 detects the abnormal state of the conveying controller 10a, 10b, or 10c in the logistic system 100. The abnormality detecting unit 43 may detect the abnormal state of the conveying controller 10a, 10b, or 10c via the conveying controller managing unit 41 that manages the conveying controllers 10a, 10b, and 10c. In addition, the abnormality detecting unit 43 may detect the abnormal controller by receiving the abnormality detecting signals from the conveying controller 10a, 10b, or 10c. Moreover, the abnormality detecting unit 43 may notify, via the display unit 31, a user such as a worker in the site of work and etc. of the occurrence of the abnormal state of the conveying controller 10a, 10b, or 10c.

The switching requesting unit 45 receives commands from the user and then outputs the switching requesting signal to switch from the abnormal controller to the alternate controlling apparatus 70, when the abnormality detecting unit 43 detects the abnormal state of the other conveying controller 10b or 10c in the logistic system 100. For example, when there are plural candidates of alternate controlling apparatuses for the alternate controllers to be switched to, the switching requesting unit 45 receives a designation of the alternate controlling apparatus 70 and a connection command to the designated alternate controlling apparatus 70 from the user and then outputs the switching requesting signal. This process is as follows.

Concretely, first, the switching requesting unit 45 notifies the user of the switching requesting message via the display unit 31. Thus, by notifying the user of the switching requesting message that provides a notification of switching from the abnormal controller to the alternate controlling apparatus, the message prompts the user to switch from the abnormal controller to the alternate controlling apparatus quickly.

Next, the switching requesting unit 45 receives the designation of the alternate controlling apparatus 70 and the connection command to the alternate controlling apparatus 70 from the user via the command inputting unit 33. Here, the following explanation will be described, assuming that the alternate controlling apparatus 70 is designated from the plural alternate controlling apparatuses. When the switching requesting unit 45 receives from the user the designation of the alternate controlling apparatus 70 and the connection command to the alternate controlling apparatus 70, the switching requesting unit 45 outputs the switching requesting signal to switch from the abnormal controller to the alternate controlling apparatus 70 to the alternate controlling apparatus 70. The switching requesting signal includes the identification information of the abnormal controller such as an IP address of the abnormal controller.

It should be noted that the switching requesting unit 45 may determine the alternate controlling apparatus 70 and output the switching requesting signal to the alternate controlling apparatus 70, without notifying the user of the switching requesting message.

The control signal receiving unit 47 receives the connection request from the alternate supervisory controller 70 via the Internet 200. In addition, the control signal receiving unit 47 receives the control signal outputted from the alternate controlling apparatus 70 in accordance with the switching requesting signal to the alternate controlling apparatus 70 outputted from the switching requesting unit 45. The control signal is a signal that performs the functionality of the conveying controller instead of the abnormal controller. For example, when the conveying controller 10b is the abnormal controller, the control signal includes a signal to command the ground controller 60b to control the operations of the conveyers 65.

The control signal outputting signal 49 outputs, instead of the abnormal controller, the control signal received by the control signal receiving unit 47. For example, when the conveying controller 10b is the abnormal controller, the control signal outputting unit 49 outputs the control signal to the ground controller 60b via the LAN 3, the LAN 5, and etc. In this case, for example, by connecting the LAN 3 and the LAN 5 directly via a switching hub, the control signal outputting unit 49 can output the control signal to the ground controller 60b. In addition, for example, an outputting route of the control signal from the control signal receiving unit 47 to the ground controller 60b may be made in the conveying controller 10a, 10b, or 10c. When the conveying controller 10b is the abnormal controller, the control signal outputting unit 49 can output the control signal to the ground controller 60b via the other conveying controller 10a or 10c in normal operation. Thus, by the operation in which the control signal outputting unit 49 outputs the control signal from the alternate controlling apparatus 70 to the ground controller 60b, even if the conveying controller 10b falls into the abnormal state, the alternate controlling apparatus 70 can perform the functionality of the conveying controller 10b instead of the conveying controller 10b.

The communication controlling unit 51 controls communications from the alternate controlling apparatus 70. For example, the communication controlling unit 51 controls the communications relating to the connection request from the alternate controlling apparatus 70. The communication controlling unit 51 performs the same operations as the communication controlling unit 27 of the conveying controller 10a described above. Namely, the communication controlling unit 51 extends the waiting time. As a result, since the communication error does not occur as soon as the waiting time is beyond the predetermined waiting time due to the time lag of the communications via the Internet 200 and etc., for example, the control signal receiving unit 47 can receive the connection request outputted from the alternate controlling apparatus 70.

(4) Structure of the Alternate Controlling Apparatus

Figure 4:
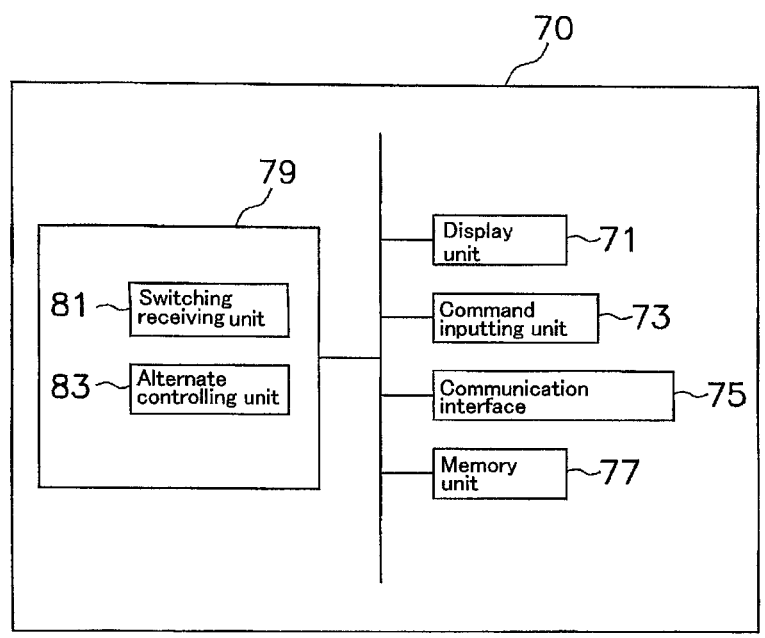
FIG. 4 is a block diagram showing a detailed structure of an alternate controlling apparatus.

The structure of the alternate controlling apparatus 70 will be explained, referring to FIG. 4. FIG. 4 is a block diagram showing the structure of the alternate controlling apparatus 70.

The alternate controlling apparatus 70 comprises a display unit 71, a command inputting unit 73, a communication interface 75, a memory unit 77, and a control unit 79.

The display unit 71 includes a display device such as a liquid crystal display panel and etc. and a touch sensor. The display unit 71 shows a service man a message relating to the switching requesting signal received by the switching receiving unit 81. On the other hand, the display unit 71 receives inputs relating to commands from the service man. The command inputting unit 73 comprises hard keys to input the commands from the service man.

The communication interface 75 sends and receives data to/from the conveying controllers 10a, 10b, and 10c or the supervisory controller 30 via the Internet 200. It should be noted that sending and receiving data is performed by using TCP/IP and etc.

The memory unit 77 comprises a Random Access Memory (RAM), a Read Only Memory (ROM), a hard disk apparatus, and etc. The RAM functions as a working area for executing a program. The ROM stores a controlling program and predetermined parameters. The hard disk apparatus stores a program that supports the logistic system 100 and a program that performs the functionality of the abnormal controller.

The control unit 79 comprises a Central Processing Unit (CPU), for example. The control unit 79 executes the controlling program stored in the memory unit 77 and controls the operations of the alternate controlling apparatus 70.

The control unit 79 comprises a switching receiving unit 81 and an alternate controlling unit 83. The switching receiving unit 81 receives the switching requesting signal to switch from the abnormal controller to the alternate controlling apparatus 70 from the switching requesting unit 21 of the conveying controller 10a, 10b, or 10c or the switching requesting unit 45 of the supervisory controller 30. The switching receiving unit 81 notifies the service man in the service center 300 of a message via the display unit 71 when the switching receiving unit 81 receives the switching requesting signal. For example, the message includes information of the reception of the switching requesting signal and identification information such as an IP address of the abnormal controller.

In this case, the service man referring to the message specifies the abnormal controller from the identification information such as the IP address. Then, the service man checks if software to execute the functionality of the abnormal controller instead of the abnormal controller exists in the alternate controlling apparatus 70. Here, if the software does not exist in the alternate controlling apparatus 70, the service man downloads the software to the alternate controlling apparatus 70. Then, when the software to execute the functionality of the abnormal controller is ready in the alternate controlling apparatus 70, the service man commands, via the command inputting unit 73 and etc., the connection to the conveying controller 10a, 10b, or 10c or the supervisory controller 30 which have outputted the switching requesting signal After this, the alternate controlling unit 83 outputs the control signal that performs the functionality of the abnormal controller instead of the abnormal controller to the conveying controller 10a, 10b, or 10c or the supervisory controller 30 that have outputted the switching requesting signal.

(5) Operations of the Logistic System when the Abnormal State of the Conveying Controller Occurs (5-1) Example 1

Figure 5:
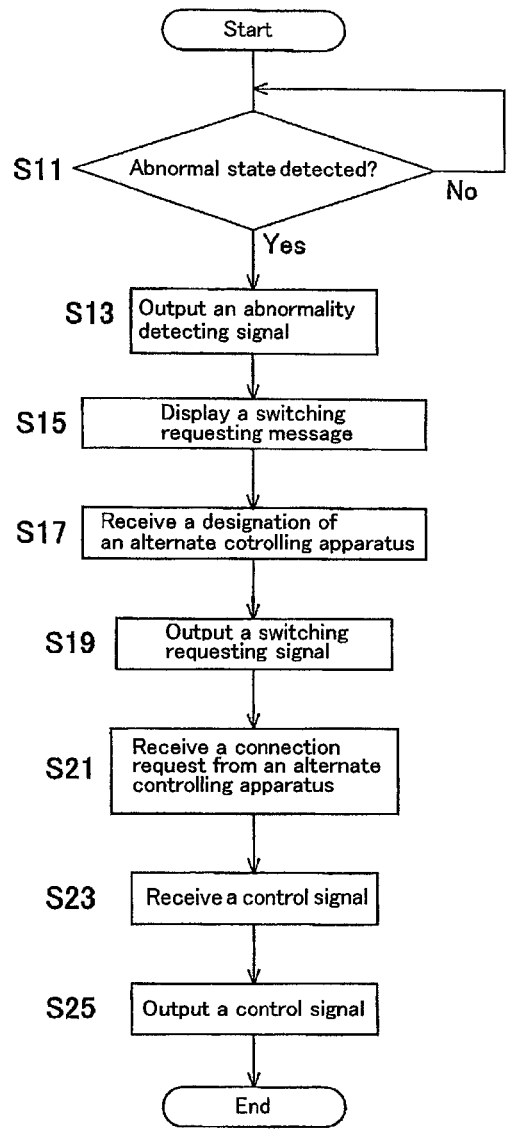
FIG. 5 is a flowchart showing an example of the operation of a logistic system when the abnormal state of the conveying controller occurs.

One example of the operations of the logistic system when the abnormal state of the conveying controller occurs will be explained, referring to FIG. 5. FIG. 5 shows a flowchart showing one example of the operations of the logistic system when the abnormal state of the conveying controller occurs.

Here, the example where the conveying controller 10a detects the occurrence of the abnormal state of the conveying controller 10b and the supervisory controller 30 outputs the switching requesting signal to the alternate controlling apparatus 70 in accordance with the commands by the user will be explained.

First, when the abnormality detecting unit 19 of the conveying controller 10a detects the abnormal state of the conveying controller 10b (YES in step S11), the abnormality detecting signal is outputted to the supervisory controller 30 (step S13). The abnormality detecting signal includes, for example, the identification information such as the IP address of the conveying controller 10b. In addition, in this case, the abnormality detecting unit 19 may notify the worker in the site of work of the occurrence of the abnormal state of the conveying controller 10b via the display unit 13.

Next, when the abnormality detecting unit 43 of the supervisory controller 30 receives the abnormality detecting signal, the switching requesting unit 45 notifies the user of the switching requesting message that provides a notification of switching from the abnormal controller 10b to the alternate controlling apparatus via the display unit 31 (step S15). Then, the switching requesting unit 45 receives the designation of the alternate controlling apparatus to be switched to and the connection command from the user via the command inputting unit 33 (step S17). Then, the switching requesting unit 45 outputs the switching requesting signal to the alternate controlling apparatus 70 that is designated by the user (step S19).

Next, the control signal receiving unit 47 of the supervisory controller 30 receives the connection request from the alternate controlling apparatus 70 via the Internet 200 (step S21). Here, when the waiting time is beyond the predetermined time, the communication controlling unit 51 extends the waiting time.

The control signal receiving unit 47 of the supervisory controller 30 receives the control signal outputted from the alternate controlling apparatus 70 after receiving the connection request from the alternate controlling apparatus 70 via the Internet 200 (step S23). The control signal includes the signal that commands the ground controller 60b to control the operations of the conveyers 65. When the control signal receiving unit 47 receives the control signal, the control signal outputting unit 49 of the supervisory controller 30 outputs the received control signal to the ground controller 60b via the LAN 3, the LAN 5, and etc (step S25).

In the above, the example where the conveying controller 10a detects the occurrence of the abnormal state of the conveying controller 10b and outputs the abnormality detecting signal to the supervisory controller 30 was presented. However, the supervisory controller 30 may detect the abnormal state of the conveying controller 10b.

In addition, the example was shown where the switching requesting unit 45 of the supervisory controller 30 notifies the user of the switching requesting message that provides a notification of switching from the abnormal controller 10b to the alternate controlling apparatus 70 via the display unit 31 and the user designate the alternate controlling apparatus 70. However, the switching requesting unit 45 may determine the alternate controlling apparatus and output the switching requesting signal directly to the alternate controlling apparatus 70, without notifying the user of the switching requesting message.

As described above, in the present embodiment, even if the abnormal state occurs to the conveying controller, the alternate controlling apparatus 70 can perform the functionality of the conveying controller instead of the abnormal controller. Therefore, it is not necessary for the whole of the logistic system 100 to be stopped until the service man in the service center visits to the factory where the logistic system 100 is arranged and fixes the abnormal controller. As a result, the lowering of productivity due to the stopping of the whole of the logistic system 100 can be avoided.

In addition, when the abnormal state occurs to the conveying controller, the switching requesting unit 45 notifies the user of the switching requesting message that provides a notification of switching from the abnormal controllers to the alternate controlling apparatus 70 via the display unit 31 of the supervisory controller 30. This prompts the user to switch from the abnormal controller to the alternate controlling apparatus 70 and therefore the user can perform the switching quickly.

(5-2) Example 2

When the abnormal state occurs to one of the plurality of conveying controllers 10a, 10b, and 10c, the conveying controllers in normal operation may send the switching requesting signal directly to the alternate controlling apparatus 70, without using the supervisory controller 30.

For example, when the abnormality detecting unit 19 of the conveying controller 10a detects the abnormal state of the conveying controller 10b, the switching requesting unit 21 of the conveying controller 10a outputs to the alternate controlling apparatus 70, via the Internet 200, the switching requesting signal to switch from the conveying controller 10b to the alternate controlling apparatus 70. Here, the abnormality detecting unit 19 may notify the worker in the site of work of the occurrence of the abnormal state of the conveying controller via the display unit 13.

After this, the control signal receiving unit 23 may receive the connection request from the alternate controlling apparatus 70 and receive the control signal outputted by the alternate controlling apparatus 70 via the Internet 200. Here, the waiting time from the output of the switching requesting signal to the receipt of the connection request of the alternate controlling apparatus 70 is beyond the predetermined waiting time, the communication controlling unit 27 extends the waiting time. Then, when the control signal receiving unit 23 receives the control signal, the control signal outputting unit 25 outputs this control signal to the ground controller 60b instead of the conveying controller 10b.

(6) Other Embodiments

In the above, one embodiment of the present invention has been explained. However, the present invention is not limited to the above-described embodiment and various changes may be made without departing from the scope of the invention. Especially, the combinations of plural embodiments and modifications that are described in the description can be made as required.

(a) In the above-described embodiments, the supervisory controller 30 and the conveying controllers 10a, 10b, and 10c notified the user of the occurrence of the abnormal state of the conveying controller via the display units 31 and 13. However, by arranging speakers to the supervisory controller 30 and the conveying controllers 10a, 10b, and 10c, the occurrence of the abnormal state of the conveying controller 10a, 10b, or 10b may be notified to the user via the speakers.

(b) The conveying controllers 10a, 10b, and 10c and the supervisory controller 30 may have functionalities of firewall and etc. and be protected from hacking to the logistic system 100 from the outside via the Internet 200. In addition, the conveying controllers 10a, 10b, and 10c, the supervisory controller 30, and the alternate controlling apparatus 70 may comprise an encrypting unit and a decrypting unit. Then, the signals received and sent via the Internet 200 may be encrypted.

(c) In the above-described embodiments, the example was presented where the communication controlling unit 27 of the conveying controllers extends the waiting time in receiving the connection request from the alternate controlling apparatus 70 (the predetermined waiting time). However, instead of setting the waiting time, the communication controlling unit 27 may monitor the states of the communication with the alternate controlling apparatus 70. In this case, since the communication controlling unit 27 monitors the states of the communication, the control signal receiving unit 23 can receive the connection request from the alternate controlling apparatus 70 without regarding the delay of the communications as the communication error even if the delay of the communications occurs due to time lag of the communications in data communications via the Internet 200.

In addition, the communication controlling unit 51 of the supervisory controller 30 may control the communications in the same manner. Namely, instead of setting the predetermined waiting time from the time when the switching requesting unit 45 outputs the switching requesting signal to the alternate controlling apparatus 70 via the Internet 200 to the time when the control signal receiving unit 47 receives the connection request from the alternate controlling apparatus 70 via the Internet 200, the communication controlling unit 51 may monitor the states of the communications with the alternate controlling apparatus 70.

INDUSTRIAL APPLICABILITY

The present invention can be applied widely to a logistic system that includes a plurality of controllers connected by a network.

EXPLANATION OF REFERENCE 1a, 1b, 1c area
3, 5 LAN
7 field network
10a, 10b, 10c conveying controller
11 communication interface
12 memory unit
13 display unit
14 control unit
15 conveying state managing unit
17 command outputting unit
19 abnormality detecting unit
21 switching requesting unit
23 control signal receiving unit
25 control signal outputting unit
27 communication controlling unit
30 supervisory controller
31 display unit
33 command inputting unit
35 communication interface
37 memory unit
39 control unit
41 conveying controller managing unit
43 abnormality detecting unit
45 switching requesting unit
47 control signal receiving unit
49 control signal outputting unit
51 communication controlling unit
60a, 60b, 60c ground controller
63 automatic guided trackless conveying vehicle
65 conveyer
67 automatic guided tracked conveying vehicle
70 alternate controlling apparatus
71 display unit
73 command inputting unit
75 communication interface
77 memory unit
79 control unit
71 switching receiving unit
83 alternate controlling unit
100 logistic system
200 Internet
300 service center

The invention claimed is:

1. A recovery method for a logistic system that includes a plurality of controllers connected with each other via a local network comprising:
    detecting whether any of the plurality of controllers n the logistic system is in an abnormal state, wherein the plurality of controllers control transportation of articles within the logistic system;
    outputting, from the logistic system to an alternate controller, a switching requesting signal to switch a controller that is detected to be in the abnormal state to the alternate controller that is connected to the logistic system via a wide area network when the abnormal state is detected, wherein the alternate controller is configured to perform a same functionality as the controller that is detected to be in the abnormal state;
    receiving a control signal that controls at least a part of operations of the logistic system from the alternate controller; and
    outputting the control signal received from the alternate controller.

2. The recovery method according to claim 1, wherein outputting the switching requesting signal includes notifying a user of a switching requesting message that provides a notification of switching from the abnormal controller to the alternate controller.

3. The recovery method according to claim 1, further comprising:
    controlling communications between the logistic system and the alternate controller via the wide area network.

4. The recovery method according to claim 1, wherein the plurality controllers include a supervisory controller and conveying controllers that are controlled by the supervisory controller; and
    in outputting the switching requesting signal, the switching requesting signal is sent from either the supervisory controller or the conveying controller, except for the abnormal controller, to the alternate controller.

5. A logistic system that includes a plurality of controllers connected with each other via a local network comprising:
    an abnormality detecting unit configured to detect whether any of the plurality of controllers in the logistic system is in an abnormal state, wherein the plurality of controllers control transportation of articles within the logistic system;
    a switching requesting unit configured to output, from the logistic system to an alternate controller, a switching requesting signal to switch a controller that is detected to be in the abnormal state to the alternate controller that is connected to the logistic system via a wide area network when the abnormal state is detected, wherein the alternate controller is configured to perform same functionality as the controller, from the logistic system to the alternate controller when the abnormal controller is detected;
a control signal receiving unit configured to receive a control signal that controls at least a part of operations of the logistic system instead of the abnormal controller from the alternate controller; and
a control signal outputting unit configured to output the control signal received from the alternate controller.

6. The logistic system according to claim 5, wherein the switching requesting unit notifies a user of a switching requesting message that provides a notification of switching from the abnormal controller to the alternate controller when the abnormal controller is detected.

7. The logistic system according to claim 5, further comprising:

a communication controlling unit configured to control communications between the logistic system and the alternate controller via the wide area network.

8. The logistic system according to claim 5, wherein the plurality of controllers include a supervisory controller and conveying controllers that are controlled by the supervisory controller; and wherein at least one of the supervisory controller and the conveying controllers comprises the switching requesting unit, the control signal receiving unit, and the control signal outputting unit.

9. The logistic system according to claim 8, wherein one of the supervisory controller and the conveying controllers, except for the abnormal controller, controls a flow of articles in the logistic system.

* * * * *

UNITED STATES PATENT AND TRADEMARK OFFICE
CERTIFICATE OF CORRECTION

PATENT NO. : 9,244,443 B2
APPLICATION NO. : 13/878740
DATED : January 26, 2016
INVENTOR(S) : Yoshimasa Kobayashi It is certified that error appears in the above-identified patent and that said Letters Patent is hereby corrected as shown below:

Title page,
Please add Item [73],
Assignee: Murata Machinery, LTD.,
Kyoto, Japan Signed and Sealed this
Twenty-first Day of June, 2016

Michelle K. Lee
*Director of the United States Patent and Trademark Office*